Sept. 14, 1926.
C. O. YOUNG
PREPARATION OF BUTYRIC ACID
Filed Oct. 31, 1922
1,599,737
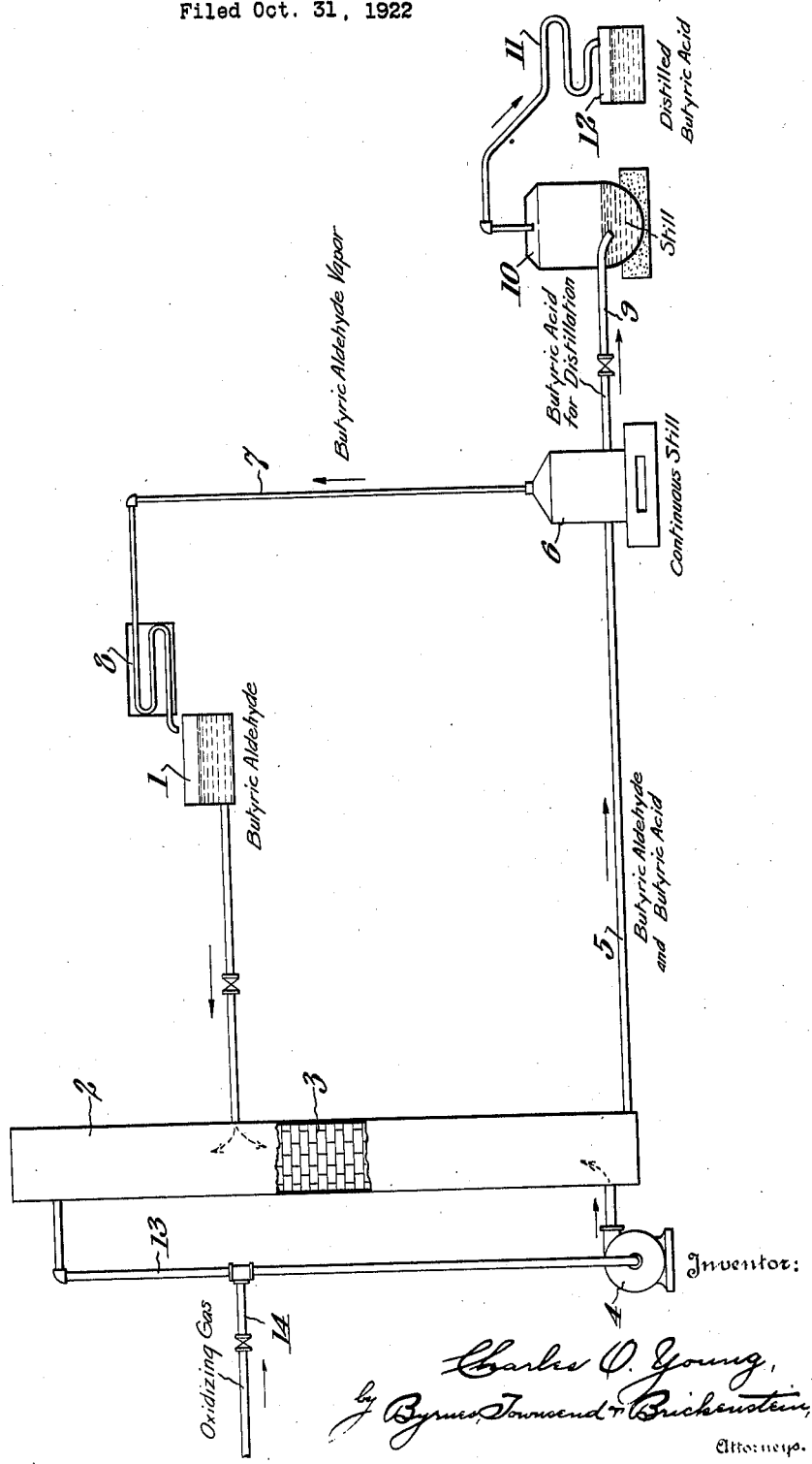

Patented Sept. 14, 1926.

1,599,737

UNITED STATES PATENT OFFICE.

CHARLES O. YOUNG, OF ELMHURST, NEW YORK, ASSIGNOR TO CARBIDE AND CARBON CHEMICALS CORPORATION, A CORPORATION OF NEW YORK.

PREPARATION OF BUTYRIC ACID.

Application filed October 31, 1922. Serial No. 598,176.

This invention relates to the production of butyric acid by oxidation of butyric aldehyde with a gaseous oxidizing agent. An essential feature of the invention is the oxidation of the greater portion of the aldehyde while in the vapor phase.

A preferred procedure will be described in connection with the accompanying drawing, which is a diagrammatic representation of a suitable system for carrying out the process.

Liquid butyric aldehyde is fed from tank 1 into reaction column 2 at about its middle portion and passes over the checkerwork 3. The butyric aldehyde should contain a suitable amount of a material adapted to facilitate oxidation. For example, a manganese salt, especially manganese butyrate, may be added to the aldehyde in amount of 0.3%, more or less.

The temperature of the column should be maintained slightly above the boiling point of butyric aldehyde. About 80° C. is satisfactory. Under these conditions the greater portion of the butyric aldehyde entering the column is vaporized. Air or oxygen is passed upwardly through the column by means of pump 4 and reacts with the aldehyde to produce butyric acid. The reaction occurs mostly in the vapor phase. Since the temperature is below that at which butyric acid volatilizes, the acid liquefies as soon as formed and flows downward through the column.

The butyric acid, in admixture with butyric aldehyde, is withdrawn from the tower through pipe 5, which discharges into a continuous still 6. The temperature of the still is above the boiling point of the aldehyde and below that of the acid. The vaporized aldehyde passes through pipe 7 to condenser 8 and thence to tank 1, for return to the reaction column. The butyric acid, freed from butyric aldehyde, flows through pipe 9 to a still 10, in which it is purified by distillation. The vapor of butyric acid coming from still 10 is condensed in cooling coil 11 and the condensate is received in tank 12.

When a gas consisting wholly or in large part of oxygen is used as the oxidizing agent, it is desirable to recirculate it, additional oxygen being supplied as necessary. For this purpose a pipe 13 may lead from the upper portion of the column to the intake side of pump 4. A branch pipe 14, connected to a suitable source of oxygen, opens into pipe 13. If air is used, it may be passed upward through the column and then vented. Suitable scrubbers to remove entrained material should generally be provided when the oxidizing gas is not to be recirculated.

The reaction proceeds satisfactorily when the gaseous oxidizing agent is supplied under pressure sufficient only to maintain its circulation. Higher pressures may be used if desired.

The temperature of the column may be maintained and regulated in ways well understood in the art. In some cases the oxidizing gas may be preheated to supply a part or all of the heat required.

I am aware that it has heretofore been proposed to oxidize liquid butyric aldehyde to butyric acid by means of air, or oxygen substantially free from other gases. The present invention is distinguished from such prior processes by the oxidation of the aldehyde chiefly in the vapor phase. The reaction is expedited by this procedure and improved yields are obtained.

The advantages of the invention are not dependent upon the specific process described, and various modifications in that process may be made within the scope of the appended claims.

I claim:

1. Process of making butyric acid, comprising introducing butyric aldehyde into a reaction chamber containing an oxidizing atmosphere maintained at a temperature above the boiling point of butyric aldehyde at the pressure prevailing in the space, but low enough to cause a liquid containing butyric acid to be formed; collecting said liquid at a point remote from the place of introducing the aldehyde; and recovering butyric acid from the liquid.

2. Process of making butyric acid, comprising introducing liquid butyric aldehyde into an intermediate portion of a reaction column maintained at a temperature above that at which butyric aldehyde normally volatilizes, passing a gas containing oxygen in counter-current to such aldehyde as remains liquid and into the space occupied by the vaporized aldehyde, withdrawing the liquid reaction product, and recovering butyric acid therefrom.

In testimony whereof, I affix my signature.

CHARLES O. YOUNG.